US008457689B2

(12) United States Patent
Lhotak (10) Patent No.: US 8,457,689 B2
(45) Date of Patent: *Jun. 4, 2013

(54) HANDHELD ELECTRONIC DEVICE WITH DEDICATED STANDBY KEY (75) Inventor: Jennifer Elizabeth Lhotak, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/007,068

(22) Filed: Jan. 14, 2011

(65) Prior Publication Data
US 2011/0171945 A1 Jul. 14, 2011

Related U.S. Application Data (63) Continuation of application No. 11/469,190, filed on Aug. 31, 2006, now Pat. No. 7,894,848.

(51) Int. Cl.
*H04M 1/00* (2006.01)
(52) U.S. Cl.
USPC ............... 455/564; 455/550.1; 455/575.1; 455/425
(58) Field of Classification Search
USPC ............ 455/550.1, 90.1, 567, 575.1, 556.1, 455/407, 412.2, 424, 425, 456.6, 186.2, 411, 455/564
See application file for complete search history.

(56) References Cited

U.S. PATENT DOCUMENTS

| 4,864,592 | A |   | 9/1989 | Lee |
| 5,636,265 | A | * | 6/1997 | O'Connell et al. ......... 455/412.1 |
| 5,805,672 | A | * | 9/1998 | Barkat et al. ............... 379/88.03 |
| 5,918,059 | A |   | 6/1999 | Tavallaei et al. |
| 6,408,188 | B1 |  | 6/2002 | Park et al. |
| 6,453,179 | B1 | * | 9/2002 | Larsen .......................... 455/566 |
| 6,470,196 | B1 | * | 10/2002 | Yamashita ..................... 455/567 |
| 6,636,458 | B1 | * | 10/2003 | Uptegraph ...................... 368/88 |
| 6,919,879 | B2 |  | 7/2005 | Griffin et al. |
| 7,099,684 | B2 | * | 8/2006 | Cowsky et al. ............ 455/550.1 |
| 7,119,706 | B1 |  | 10/2006 | Cortopassi et al. |
| 7,167,729 | B1 |  | 1/2007 | Kimura |

(Continued)

FOREIGN PATENT DOCUMENTS

| EP | 0918427 | 5/1999 |
| EP | 1480157 | 11/2004 |

(Continued)

OTHER PUBLICATIONS

User's Guide for Nokia N80, http://web.archive.org/web/20060629093748/http://www.techteam.gr/mobile/specs/guides/NokiaN80en.pdf Jun. 29, 2006.

(Continued)

*Primary Examiner* — Dominic E Rego
(74) *Attorney, Agent, or Firm* — Integral Intellectual Property Inc.; Miriam Paton (57) ABSTRACT

A handheld electronic device comprises a dedicated standby key for initiating a standby mode in the handheld electronic device. The handheld electronic device further comprises means for disabling at least a portion of a keyboard and any navigation actuator of the handheld electronic device upon entry into the standby mode. The dedicated standby key is embedded along a first edge of the handheld electronic device.

19 Claims, 4 Drawing Sheets

U.S. PATENT DOCUMENTS

| | | | |
|---|---|---|---|
| 7,248,867 B2 * | 7/2007 | Strawn | 455/423 |
| 7,406,612 B2 | 7/2008 | O'Connor et al. | |
| 7,443,404 B2 | 10/2008 | Kawamoto et al. | |
| 7,636,588 B2 * | 12/2009 | Lee et al. | 455/574 |
| 7,684,791 B2 * | 3/2010 | Plestid et al. | 455/418 |
| 7,957,729 B2 * | 6/2011 | Roter et al. | 455/422.1 |
| 8,073,470 B1 * | 12/2011 | Collins et al. | 455/458 |
| 2001/0041606 A1 * | 11/2001 | Aoki et al. | 455/575 |
| 2002/0129036 A1 | 9/2002 | Ho Yuen Lok et al. | |
| 2002/0146989 A1 * | 10/2002 | Moriki | 455/90 |
| 2003/0096650 A1 | 5/2003 | Eguchi et al. | |
| 2004/0005908 A1 * | 1/2004 | Crisp | 455/550.1 |
| 2004/0056837 A1 | 3/2004 | Koga et al. | |
| 2004/0109442 A1 | 6/2004 | Kato et al. | |
| 2004/0200701 A1 | 10/2004 | Nakatani et al. | |
| 2004/0203674 A1 * | 10/2004 | Shi et al. | 455/415 |
| 2004/0204123 A1 | 10/2004 | Cowsky et al. | |
| 2004/0209569 A1 * | 10/2004 | Heinonen et al. | 455/41.2 |
| 2004/0221183 A1 * | 11/2004 | Lu | 713/300 |
| 2004/0266350 A1 | 12/2004 | Kim | |
| 2005/0021459 A1 | 1/2005 | Bell | |
| 2005/0037819 A1 * | 2/2005 | Naor | 455/574 |
| 2005/0047576 A1 | 3/2005 | Hidesawa | |
| 2005/0113087 A1 * | 5/2005 | Rick et al. | 455/434 |
| 2005/0202820 A1 | 9/2005 | Washio | |
| 2005/0288063 A1 * | 12/2005 | Seo et al. | 455/563 |
| 2006/0026351 A1 | 2/2006 | Agata et al. | |
| 2006/0030367 A1 * | 2/2006 | Cowsky et al. | 455/565 |
| 2006/0047980 A1 | 3/2006 | Price et al. | |
| 2006/0058079 A1 | 3/2006 | Goto | |
| 2006/0116102 A1 * | 6/2006 | Brown et al. | 455/343.1 |
| 2006/0181435 A1 | 8/2006 | Yang | |
| 2006/0183469 A1 | 8/2006 | Gadson | |
| 2006/0195504 A1 | 8/2006 | Hirata et al. | |
| 2007/0033099 A1 | 2/2007 | Zhu | |
| 2007/0054651 A1 * | 3/2007 | Farmer et al. | 455/352 |
| 2007/0195038 A1 | 8/2007 | Kida et al. | |
| 2007/0202871 A1 * | 8/2007 | Altshuller et al. | 455/428 |
| 2007/0281748 A1 * | 12/2007 | Piekarski | 455/565 |
| 2008/0122945 A1 | 5/2008 | Ahonen | |
| 2009/0137291 A1 | 5/2009 | Griffin | |
| 2010/0029303 A1 * | 2/2010 | Lim et al. | 455/466 |
| 2010/0167787 A1 * | 7/2010 | Weisbrod | 455/566 |

FOREIGN PATENT DOCUMENTS

| | | |
|---|---|---|
| EP | 1536614 | 6/2005 |
| GB | 2341753 | 3/2000 |
| KR | 20050079475 | 10/2005 |
| WO | 9937077 | 7/1999 |

OTHER PUBLICATIONS

Chau, Simon, Second Office Action for CA 2,598,880, Jul. 15, 2010.

Hess, Arne, Review: Samsung SGH-i300 Windows Mobile Smartphone 2003 SE—Part I, http://www.theunwired.net/?itemid+2703 Oct. 22, 2005.

Nokia 636 Owner's Manual, http://www.nokiausa.com/get-support-and-software/product-support/nokia-636/user-guides Dec. 19, 1996.

"Nokia 6021 User Guide" Copyright 2005 cover page and p. 24, retrieved online http://nds1.nokia.com/phones/files/guides/Nokia_6021_UG_en.pdf.

Chau, Simon, Third Office Action for CA 2,598,880, Aug. 9, 2011.

Anonymous: "Nokia N80", Feb. 11, 2013; XP055052897, Retrieved from the internet: URL:http//www.gsmarena.com/nokia_n80-1347.php.

Legrand, J et al., Summons to attend Oral Proceedings for EP 06119871.9, Feb. 18, 2013.

* cited by examiner

HANDHELD ELECTRONIC DEVICE WITH DEDICATED STANDBY KEY

CROSS-REFERENCE TO RELATED APPLICATIONS

This application is a continuation of U.S. patent application Ser. No. 11/469,190 filed Aug. 31, 2006, entitled "System and Method for Providing a Standby Mode in a Handheld Electronic Device", which will issue on Feb. 22, 2011 as U.S. Pat. No. 7,894,848, and which is incorporated by reference herein in its entirety.

BACKGROUND

The present invention relates generally to handheld electronic devices, and more particularly, to improvements in arrangements that allow a user to enable and disable certain features of the handheld electronic devices.

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable, and thus are relatively small. Many handheld electronic devices also features wireless communication capability, including wireless voice and data communication. With advances in technology, handheld electronic devices are being configured to include greater numbers of features while having relatively small form factors that may be readily stored (e.g. in a pocket or purse).

While convenient for mobility, storage and handling of the devices in and out of pockets or purses may increase the likelihood that a user may inadvertently actuate one or more keys, resulting in excessive power consumption (battery drain) or unintended operations being carried out, such as making accidental calls or sending out inadvertent messages.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

As noted above, the present invention relates generally to improvements in systems and methods for allowing a user to enable and disable certain device features.

Figure 1:
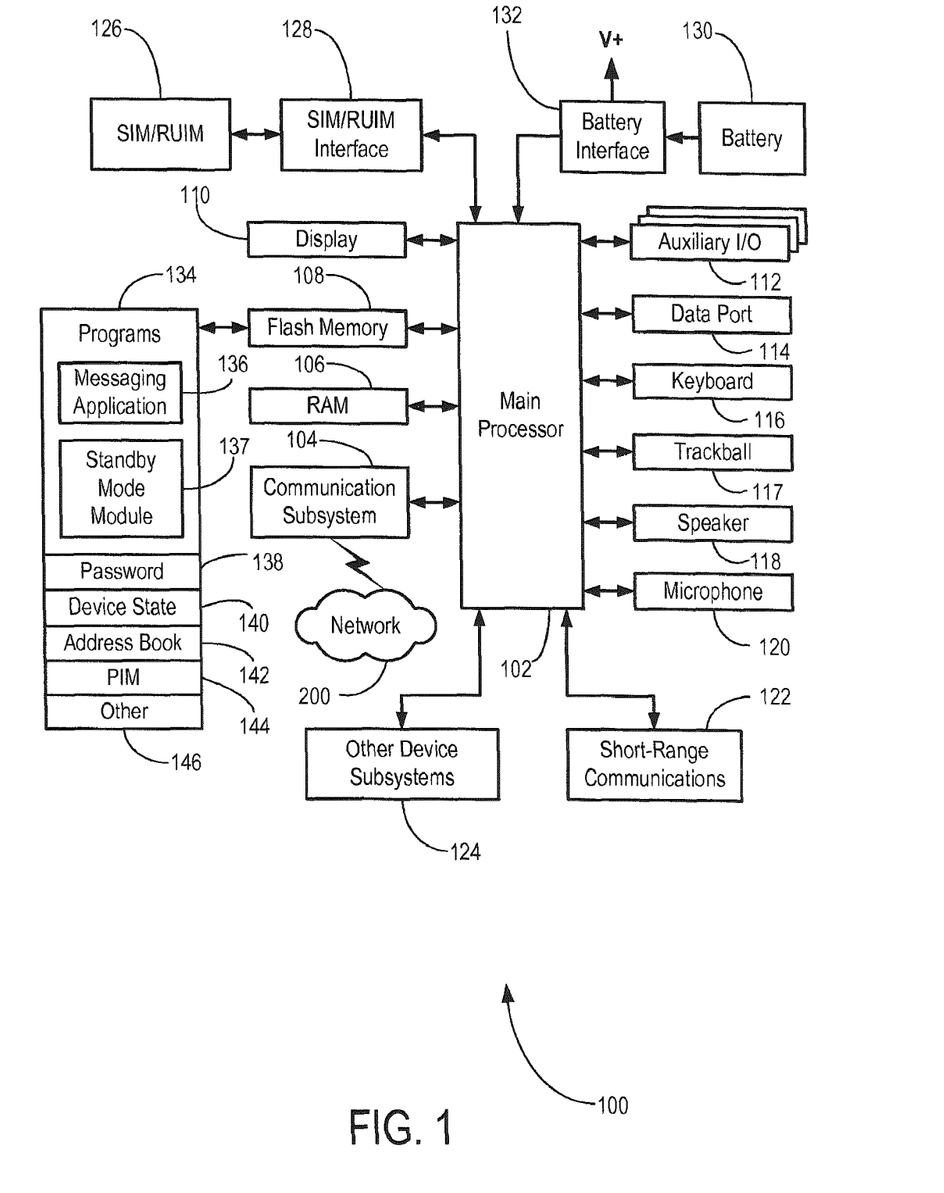
FIG. 1 is a schematic block diagram of various components that may be found in a handheld mobile communication device.

In an illustrative embodiment, the invention may be practiced with a handheld mobile communication device in a wireless operating environment. Shown in FIG. 1 is a schematic block diagram of an illustrative mobile communication device 100. The communication device 100 may comprise a number of components, including a main processor 102 which controls the overall operation of communication device 100. Communication functions, including data and voice communications, may be performed through a communication subsystem 104. The communication subsystem 104 may receive messages from and sends messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122 and other device subsystems 124.

Some of the subsystems of the communication device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing a user to depress the trackball, to allow selection of a highlighted item.

Operating system software used by the main processor 102 is typically stored in a persistent store such as flash memory 108. Those skilled in the art will appreciate that the operating system, specific device applications, or parts thereof, may be temporarily loaded into a volatile store such as the RAM 106.

The communication device 100 may send and receive communication signals over the wireless network 200 after required network registration or activation procedures have been completed. Network access may be associated with a subscriber or user of the communication device 100.

The communication device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communication device 100.

The main processor 102, in addition to its operating system functions, enables execution of software applications 134 on the communication device 100. The subset of software applications 134 that control basic device operations, including data and voice communication applications, will normally be installed on the communication device 100 during its manufacture.

The software applications 134 may include a messaging application 136. The messaging application 136 can be any suitable software program that allows a subscriber or user of the communication device 100 to send and receive wireless text communications. Various alternatives exist for the messaging application 136 as is well known to those skilled in the art. Messages that have been sent or received by the user are typically stored in local storage such as flash memory 108 of the communication device 100, or in some other suitable storage element in the communication device 100. In an alternative embodiment, some of the sent and received messages may be stored remotely from the device 100 such as in a data store of an associated host system that the communication device 100 communicates with.

The software applications 134 may also include a standby mode module 137 for providing arrangements for entering into and exiting out of a device standby mode. In accordance with various embodiments, the standby mode module 137 may be used to disable certain functional features of the device, such as the keyboard 116 and the trackball 117. Illustrative examples will be described in detail further below.

Another program that may be executed by the communication device 100 is a password approval module 138 that may provide approval for user passwords. The password approval module 138 may execute a password approval method to determine whether the user password specified by the user of the communication device 100 is approved.

The communication device 100 may further include a device state module 140, an address book 142, a Personal Information Manager (PIM) 144, and various other modules 146. Additional applications may also be loaded onto the communication device 100 through at least one of the wireless network 200, the auxiliary I/O subsystem 112, the data port 114, the short-range communications subsystem 122, or another subsystem 124.

The data port 114 enables a subscriber or user to set preferences through an external device or software application and extends the capabilities of the communication device 100 by providing for information or software downloads to the communication device 100 other than through a wireless communication network. The alternate download path may, for example, be used to load an encryption key onto the communication device 100 through a direct and thus reliable and trusted connection to provide secure device communication.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

Figure 2:
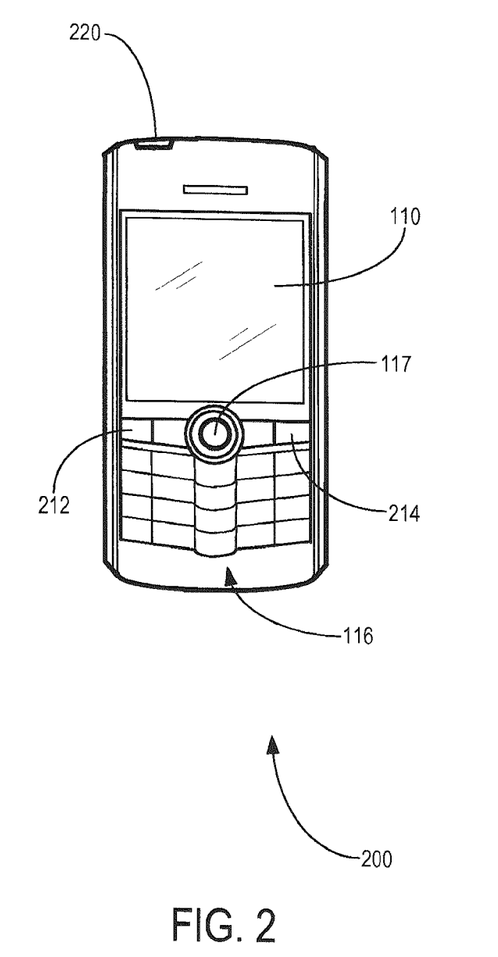
FIG. 2 is a front view of an illustrative handheld electronic device in accordance with an embodiment.

Now referring to FIG. 2, shown is an illustrative handheld mobile communication device 200 which may contain the various components illustrated in FIG. 1. As shown, device 200 may include a keyboard 116 having a plurality of keys for entering text and for operating various functional features of the device 200. Keyboard 116 may also include special function keys, such as a call answer key 212 and a call disconnect key 214. These special function keys 212, 214 may be dedicated to their particular function, or alternatively they may be multi-function keys having different functions depending on the particular operating mode of device 200.

Device 200 may further include a navigation actuator, such as a trackball 117, for allowing a user to perform various navigation and selection functions as previously described with reference to FIG. 1. For example, trackball 117 may allow navigation and selection of a GUI menu displayed in display 110.

Because the trackball 117 experiences high utilization when the user is interacting with the device 200, it is advantageous for the trackball 117 to be centrally located on the front face of device 200. In the present illustrative embodiment, the trackball 117 is between the upper display 110 and lower key field 116. Given this prominent central location, the trackball 117 may be especially prone to inadvertent user activation during handling and storage (e.g. in a pocket or purse), which may result in an undesired operation being executed. Keys in the keyboard 116, such as the call answer key 212 and the call disconnect key 214, may also be prone to inadvertent user activation when the device is handled and stored.

In order to avoid inadvertent user actuation of the trackball 117 and keyboard 116, it is advantageous to place the trackball 117 and keyboard 116 into a standby mode before storage (e.g. in a pocket or purse). However, in order to do so easily, the inventor has found it to be especially advantageous to provide a dedicated standby key 220 in a location that is less prone to inadvertent activation.

In this illustrative example, standby key 220 is provided along one edge of device 200 and is the only key provided along that edge. Preferably, standby key 220 is a single-action key that allows the device 200 to initiate the standby mode without the need to actuate any other key.

Standby key 220 may also be recessed so that it is substantially flush with the edge of device 200. Due to its location, the recessed standby key 220 is more difficult to actuate accidentally, and requires a more definitive user action.

In an embodiment, the standby key 220 may also be located such that it is easily identified simply by handling the device 200. For example, a user may identify that a key situated along the edge closest to the smooth display 110, and opposite the edge closest to the keyboard 116, is the standby key 220. Thus, as a user is slipping the device 200 into a pocket or purse, or taking the device 200 out of the pocket or purse, the user may actuate the standby key 220 without having to visually confirm that it is the correct key.

In another embodiment, a key other than the standby key 220 may be designated to exit the standby mode. For example, the call disconnect key 214 may be designated. In this case, in order to avoid inadvertent actuation, a "press-and-hold" may be required for a predetermined period of time before the device 100 exits standby mode using this alternative key.

In another embodiment, the trackball 117 may be used in combination with another key to exit the standby mode. The combination may be sequential (within a predefined period of time), or simultaneous. For example, a combination of rolling trackball 117 and pressing a designated key other than the standby key 220 may trigger an exit from standby mode. Alternatively, pressing trackball 117 and a designated key other than the standby key 220 may trigger an exit from standby mode. Generally speaking, the combination of actions should be a combination that requires deliberate action and that is not likely to result accidentally.

Methods of entering and exiting standby mode in device 200 in accordance with various embodiments are now described with reference to FIG. 3, FIG. 4 and FIG. 5.

Figure 3:
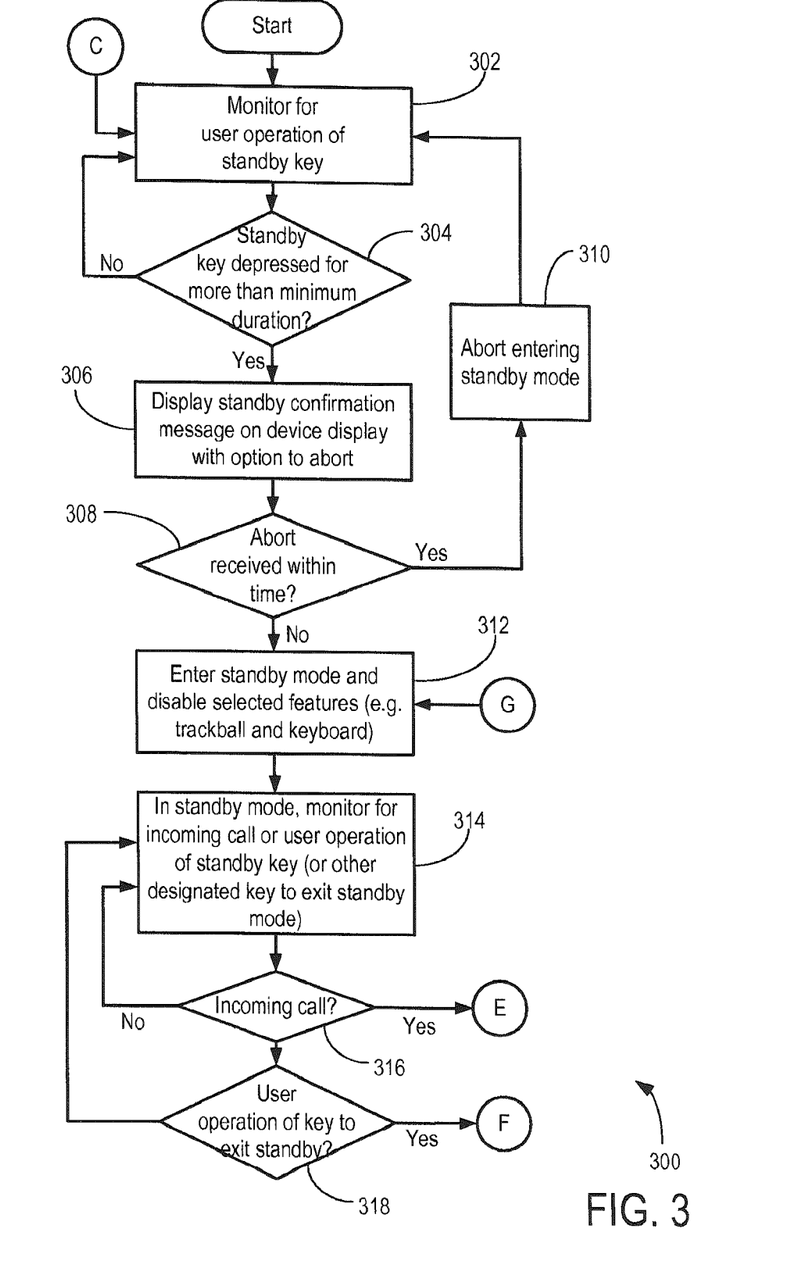
FIG. 3 to FIG. 5 show illustrative flowcharts of methods in accordance with various embodiments.

Now referring to FIG. 3, shown is a method 300 in accordance with an embodiment. Method 300 starts and, at block 302, monitors standby key 220 for user operation of the key 220.

Upon detecting actuation of the standby key 220, method 300 proceeds to decision block 304 where method 300 determines if the standby key 220 has been depressed for more than a minimum duration. If no, method 300 assumes that the standby key was actuated inadvertently and returns to block 302 to continue monitoring for user operation of the standby key 220. If yes, method 300 proceeds to block 306 where method 300 may display a confirmation message with an option to abort. For example, method 300 may display on display 100 a text message such as "Now entering standby mode. Press the standby key to exit". Such a confirmation message may be displayed for a predetermined time period to allow a user to abort entering standby mode if the user had actuated the standby key 220 in error, or has changed his mind.

Method 300 then proceeds to decision block 308, where method 300 determines if an abort instruction (e.g. the user presses any key) has been received in a specified amount of time. If yes, method 300 may proceed to block 310, where method 300 aborts the standby routine and returns to block 302 to continue monitoring for actuation of the standby key 220. If no, method 300 proceeds to block 312.

At block 312, method 300 enters standby mode and disables selected device features. For example, the trackball 117 and keyboard 116 of device 200 may be disabled for immediate actuation upon entering standby mode.

While the device 200 is in standby mode, it may be desirable for certain features of the device to become active upon occurrence of certain events. For example, the user may want an incoming telephone call to activate certain keys on the keyboard 116. As another example, the user may initiate an exit from standby mode in order to use a feature of the device 200.

Thus, at block 314, while the device 200 is in standby mode, method 300 may monitor device 200 for incoming calls, and for user operation of the standby key 220 (or any other key designated for exiting the device) to exit the standby mode. At decision block 316, if there is an incoming call method 300 proceeds to method 400 (FIG. 4) as described below. At decision block 318, if there is user operation of the standby key 220, method 300 proceeds to method 500 (FIG. 5) as described further below.

Figure 4:
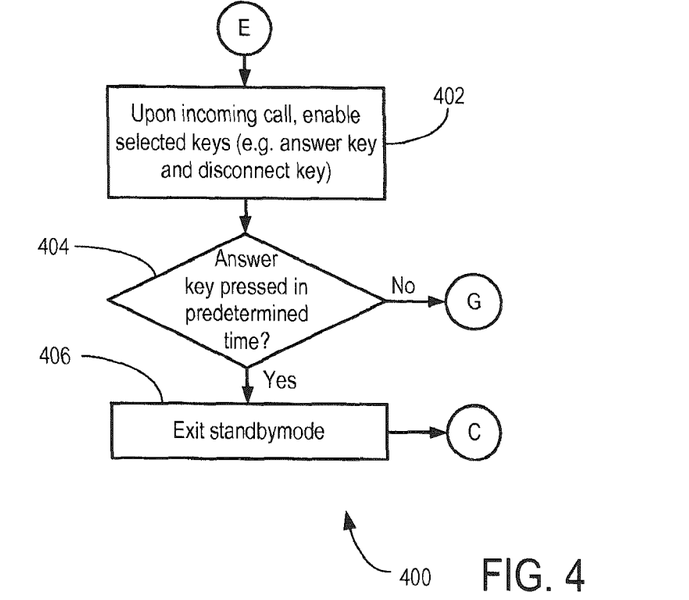

Now referring to FIG. 4, shown is method 400 in accordance with an embodiment. Method 400 begins as method 300 (FIG. 3) detects an incoming telephone call. In an embodiment, upon detecting the incoming call, method 400 enables selected keys for immediate actuation.

In one embodiment, method 400 may enable all keys of keyboard 116. This may allow a user to retrieve the device 200 from a pocket or purse and answer the call by activating the call connect key 212 (FIG. 2).

In another embodiment, method 400 may enable the trackball 117 to allow navigation of a menu displayed on display 110. For example, the menu 110 may display the incoming call telephone number and an associated caller name (e.g. as provided by a carrier's call display function, or as retrieved from a local telephone directory), and allow the user to choose to take the call (e.g. by depressing the trackball 117) or not (e.g. by not taking any further action).

In another embodiment, method 400 may enable only certain keys of the keyboard 116 for immediate actuation. For example, method 400 may enable the call answer key 212 and the call disconnect key 214, so that a user may select to answer the call (by actuating the call answer key 212) or to shorten the ringing or vibration of device 200 (by actuating the call disconnect key 214).

In yet another embodiment, method 400 may enable only the call answer key 212, so that the user may only select to answer the call (by activating the call answer key 212) or not (by not taking any action).

At decision block 404, method 400 may determine if the call answer key 212 is actuated by the user. If yes, method 400 may exit standby mode at block 406 and proceed back to block 302 of method 300 (FIG. 3). If no, method 400 may exit and return to block 312 of method 300 (FIG. 3).

Figure 5:
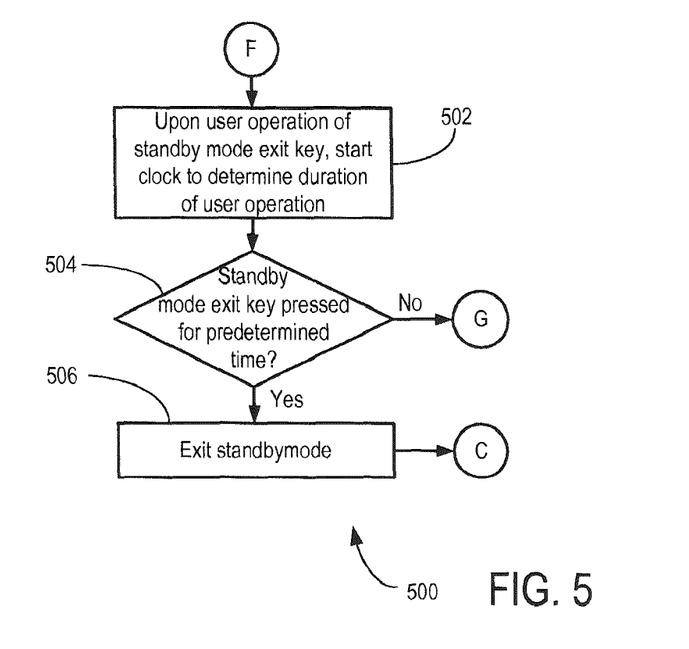

Now referring to FIG. 5, shown is a method 500 in accordance with an embodiment. Method 500 may begin upon detection of a user action to exit the device from standby mode at decision block 318 of FIG. 3. For example, the required user action may be activation of the standby key 220, which in this case may act as a toggle key to initiate the exit from standby mode.

In an embodiment, rather than an instantaneous exit from standby mode, it has been found advantageous to provide a suitable delay. This may avoid an inadvertent exit from standby mode when the user accidentally hits the standby key 220. Thus, at block 502, upon user operation of the standby key 220, a timer may start to time the duration for which the standby key 220 is depressed.

At decision block 504, method 500 determines if the standby key 220 has been depressed for a sufficiently long duration. If yes, method 500 exits standby mode and proceeds to block 302 of method 300 (FIG. 3). If no, method 500 exits and returns to block 312 of method 300 (FIG. 3).

As will be appreciated, the systems and methods for providing a standby mode in handheld electronic devices as described above may allow a user to conveniently enter and exit standby mode for devices that may be prone to inadvertent actuation (e.g. when stored in or retrieved from a pocket or purse).

In an alternative embodiment, the device 100 may be placed in standby mode in other ways, such as an auto on/off triggering event. For example, when device 100 first turns on during an auto on event, and no key press is detected within a predetermined time period, the device 100 may be put into standby mode without having the user touch any key. As another example, during use of the device 100, if there is no user operation for a predetermined period of time, device 100 may time out and enter standby mode automatically.

Thus, in an aspect of the invention, there is provided a system for providing a standby mode in a handheld electronic device, comprising: a standby key for initiating the standby mode in the handheld electronic device; a display for displaying a confirmation message of entry into the standby mode; and a standby mode module for disabling at least one feature of the handheld electronic device upon entry into the standby mode.

In an embodiment, the standby key is actuable with a single action.

In another embodiment, the display is configured to further display a message providing an option to abort entry into the standby mode.

In another embodiment, the system further comprises user actuable means for aborting entry into the standby mode.

In another embodiment, the user actuable means for aborting entry into the standby mode comprises at least one of the standby key, another designated key, and a trackball.

In another embodiment, the standby key is located along a first edge of the handheld electronic device, and is the only key provided along the first edge of the handheld electronic device.

In another embodiment, the standby key located at a recessed portion of the first edge of the handheld electronic device, such that the standby key is substantially flush with or recessed from the surface of the first edge of the handheld electronic device.

In another embodiment, the at least one disabled feature is at least a portion of the keyboard and any navigation actuator provided on the handheld electronic device.

In another embodiment, the system further comprises means for enabling at least one of a call answer key and a call disconnect key when an incoming telephone call is detected by the standby mode module.

In another embodiment, the system further comprises user actuable means for exiting the standby mode.

In another embodiment, the user actuable means for exiting the standby mode comprises at least one of the standby key, another designated key, and a trackball.

In another aspect of the invention, there is provided a method of providing a standby mode in a handheld electronic device, comprising: initiating a standby mode upon actuation of a standby key in the handheld electronic device; displaying a confirmation message of entry into the standby mode; and disabling at least one feature of the handheld electronic device upon entry into the standby mode.

In an embodiment, the method further comprises initiating the standby mode upon actuation of the standby key using a single action.

In another embodiment, the method further comprises displaying a message providing an option to abort entry into the standby mode.

In another embodiment, the method further comprises aborting entry into the standby mode upon actuation of a user actuable means.

In another embodiment, the method further comprises configuring at least one of the standby key, another designated key, and a trackball as the user actuable means.

In another embodiment, the method further comprises disabling at least a portion of the keyboard and any navigation actuator provided on the handheld electronic device upon entering into the standby mode.

In another embodiment, the method further comprises enabling at least one of a call answer key and a call disconnect key when an incoming telephone call is detected by the standby mode module.

In another embodiment, the method further comprises configuring user actuable means for exiting the standby mode.

In another embodiment, the method further comprises configuring at least one of the standby key, another designated key, and a trackball as the user actuable means.

In another aspect of the invention, there is provided a data processor readable medium storing data processor code that when loaded into a handheld electronic device adapts the device to provide a standby mode, the readable medium comprising: code for initiating a standby mode upon actuation of a standby key in the handheld electronic device; code for displaying a confirmation message of entry into the standby mode; and code for disabling at least one feature of the handheld electronic device upon entry into the standby mode.

In an embodiment, the data processor readable medium further comprises code for initiating the standby mode upon actuation of the standby key using a single action.

In another embodiment, the data processor readable medium further comprises code for displaying a message providing an option to abort entry into the standby mode.

In another embodiment, the data processor readable medium further comprises code for aborting entry into the standby mode upon actuation of a user actuable means.

In another embodiment, the data processor readable medium further comprises code for configuring at least one of the standby key, another designated key, and a trackball as the user actuable means.

In another embodiment, the data processor readable medium further comprises code for disabling at least a portion of the keyboard and any navigation actuator provided on the handheld electronic device upon entering into the standby mode.

In another embodiment, the data processor readable medium further comprises code for enabling at least one of a call answer key and a call disconnect key when an incoming telephone call is detected by the standby mode module.

In another embodiment, the data processor readable medium further comprises code for configuring user actuable means for exiting the standby mode.

In another embodiment, the data processor readable medium further comprises code for configuring at least one of the standby key, another designated key, and a trackball as the user actuable means.

While illustrative embodiments have been described above, it will be appreciated that various changes and modifications may be made. More generally, the scope of the invention is defined by the following claims.

What is claimed is:

1. A handheld electronic device, comprising:
   a dedicated standby key for initiating a standby mode in the handheld electronic device; and
   means for disabling at least a portion of a keyboard and any navigation actuator of the handheld electronic device upon entry into the standby mode,
   wherein while the electronic device is in the standby mode, a processor of the electronic device is capable of monitoring events at the electronic device, and
   wherein the dedicated standby key is embedded along a first edge of the handheld electronic device, and
   wherein a display of said handheld electronic device is configured to display, in response to depressing said dedicated standby key for more than a minimum duration, a message providing an option to abort entry into the standby mode.

2. The handheld electronic device of claim 1, wherein the first edge is closest to the display of said handheld electronic device and is opposite a second edge of the handheld electronic device that is closer to a keyboard of the handheld electronic device.

3. The handheld electronic device of claim 1, wherein the dedicated standby key is the only key provided along the first edge.

4. The handheld electronic device of claim 1, wherein the dedicated standby key is located at a recessed portion of the first edge, such that the dedicated standby key is flush with a surface of the first edge.

5. The handheld electronic device of claim 1, wherein initiating the standby mode is the sole functionality assigned to depression of the dedicated standby key.

6. The handheld electronic device of claim 1, wherein the handheld electronic device is configured to enter the standby mode following actuation of the dedicated standby key and prior to actuation of any other key of the handheld electronic device.

7. The handheld electronic device of claim 1, wherein the display of said handheld electronic device is configured to display a confirmation of entry of the handheld electronic device into the standby mode.

8. The handheld electronic device of claim 1, further comprising user actuable means for aborting entry into the standby mode.

9. The handheld electronic device of claim 8, wherein the user actuable means for aborting entry into the standby mode comprises the dedicated standby key.

10. The handheld electronic device of claim 8, wherein the user actuable means for aborting entry into the standby mode comprises another designated key of the handheld electronic device.

11. The handheld electronic device of claim 8, wherein the user actuable means for aborting entry into the standby mode comprises a navigation actuator of the handheld electronic device.

12. The handheld electronic device of claim 1, further comprising user actuable means for exiting the standby mode.

13. The handheld electronic device of claim 12, wherein the user actuable means for exiting the standby mode comprises the dedicated standby key.

14. The handheld electronic device of claim 12, wherein the user actuable means for exiting the standby mode comprises another designated key of the handheld electronic device.

15. The handheld electronic device of claim 12, wherein the user actuable means for exiting the standby mode comprises a navigation actuator of the handheld electronic device.

16. The handheld electronic device of claim 1, wherein the dedicated standby key is located at a recessed portion of the first edge, such that the dedicated standby key is recessed from a surface of the first edge.

17. The handheld electronic device of claim 1, wherein the dedicated standby key is a single-action key that allows initiating the standby mode without the need to actuate any other key of the handheld electronic device.

18. A handheld electronic device, comprising:
a dedicated standby key for initiating a standby mode in the handheld electronic device;
means for disabling a call answer key, at least a portion of a keyboard and any navigation actuator of the handheld electronic device upon entry into the standby mode; and
means for enabling only the disabled call answer key when an incoming telephone call is detected while the handheld electronic device is in standby mode,
wherein the dedicated standby key is embedded along a first edge of the handheld electronic device.

19. A handheld electronic device, comprising:
a dedicated standby key for initiating a standby mode in the handheld electronic device;
means for disabling a call answer key, a call disconnect key, at least a portion of a keyboard and any navigation actuator of the handheld electronic device upon entry into the standby mode; and
means for enabling only the disabled call answer key and the disabled call disconnect key when an incoming telephone call is detected while the handheld electronic device is in standby mode,
wherein the dedicated standby key is embedded along a first edge of the handheld electronic device.

* * * * *